(12) United States Patent
Emmerling et al.

(10) Patent No.: US 8,461,974 B2
(45) Date of Patent: Jun. 11, 2013

(54) ELECTRIC CIRCUIT FOR AN ACCESS CONTROL AND FOR AN IMMOBILIZER OF A VEHICLE AND METHOD FOR CALIBRATING AN ANTENNA DRIVER

(75) Inventors: Ulrich Emmerling, Kelheim (DE); Bernhard Förstl, Ihrlerstein (DE); Daniel Hostmann, Regensburg (DE); Matthias Huschenbett, Regensburg (DE); Luc Jansseune, Venerque (FR); Rupert Schuster, Rohrbach (DE); Roland Wagner, Kassel (DE)

(73) Assignees: Continental Automotive GmbH, Hannover (DE); Continental Automotive France, Toulouse (FR)

( * ) Notice: Subject to any disclaimer, the term of this patent is extended or adjusted under 35 U.S.C. 154(b) by 213 days.

(21) Appl. No.: 12/921,039

(22) PCT Filed: Mar. 3, 2009

(86) PCT No.: PCT/EP2009/052508
§ 371 (c)(1),
(2), (4) Date: Oct. 26, 2010

(87) PCT Pub. No.: WO2009/109578
PCT Pub. Date: Sep. 11, 2009

(65) Prior Publication Data
US 2011/0037578 A1 Feb. 17, 2011

(30) Foreign Application Priority Data

Mar. 6, 2008 (DE) .......................... 10 2008 012 882

(51) Int. Cl.
*B60R 25/10* (2006.01)
(52) U.S. Cl.
USPC .............. 340/426.11; 340/426.1; 340/426.16; 340/539.19

(58) Field of Classification Search
USPC ................. 340/426.11, 425.5, 426.6, 426.12, 340/426.16, 539.19, 426.1, 10.1, 10.3; 307/10.2, 307/10.3
See application file for complete search history.

(56) References Cited

U.S. PATENT DOCUMENTS 5,742,236 A 4/1998 Cremers et al. .......... 340/825.31
5,841,363 A * 11/1998 Jakob et al. ................... 340/5.26
(Continued)

FOREIGN PATENT DOCUMENTS

DE  43 40 260 A1   4/1995
DE  100 63 971 A1  7/2002
(Continued)

OTHER PUBLICATIONS

International PCT Search Report, PCT/EP2009/052508, 16 pages, mailed Aug. 25, 2009.
(Continued)

*Primary Examiner* — Anh V La
(74) *Attorney, Agent, or Firm* — King & Spalding L.L.P.

(57) ABSTRACT

An electric circuit for controlling the access and immobilizing a vehicle has a first antenna driver (12) for driving a first antenna (19) for emitting a signal (100) in the event of identification of an ID transmitter (3) for access control of a vehicle. A second antenna driver (24) is provided for driving a second antenna (21) for emitting a signal (104) in the event of identification of an ID transmitter (3) for the immobilizer of the vehicle. In addition, the electric circuit has a receiver device (14) for receiving a signal captured by an antenna (21) for the identification of an ID transmitter (3) for the immobilizer. The first antenna driver (12) and the receiver device (14) are commonly integrated into a semiconductor chip (1).

17 Claims, 1 Drawing Sheet

U.S. PATENT DOCUMENTS

| | | |
|---|---|---|
| 6,329,909 B1 | 12/2001 | Siedentop et al. ............ 340/426 |
| 6,356,186 B1 * | 3/2002 | Price et al. ............... 340/426.11 |
| 6,801,120 B2 | 10/2004 | Hara ............................ 340/5.72 |
| 7,046,119 B2 * | 5/2006 | Ghabra et al. ............... 340/5.72 |
| 7,317,376 B2 | 1/2008 | Nakamura et al. ........... 340/5.61 |
| 7,359,448 B2 | 4/2008 | King et al. .................... 375/268 |
| 7,365,697 B2 | 4/2008 | Naito ............................ 343/788 |
| 7,492,250 B2 * | 2/2009 | Yoshida et al. .......... 340/539.19 |
| 7,589,433 B2 | 9/2009 | Otani et al. .................. 307/10.2 |
| 7,986,960 B2 | 7/2011 | Ghabra et al. ................ 455/522 |
| 2006/0022795 A1 | 2/2006 | Nakamura et al. ........... 340/5.61 |
| 2008/0169898 A1 | 7/2008 | Kato et al. ..................... 340/5.1 |
| 2011/0037578 A1 | 2/2011 | Emmerling et al. ..... 340/426.11 |

FOREIGN PATENT DOCUMENTS

| | | |
|---|---|---|
| DE | 10202162 A1 | 7/2003 |
| DE | 103 04 463 A1 | 3/2004 |
| DE | 10 2005 059226 A1 | 7/2006 |
| DE | 102006022354 A1 | 12/2006 |
| DE | 10 2008 004240 A1 | 8/2008 |
| EP | 0 671 528 A | 9/1995 |
| FR | 2841392 | 12/2003 |
| JP | 2005329733 A | 12/2005 |
| JP | 2007189553 A | 7/2007 |
| JP | 2008038514 A | 2/2008 |
| JP | 2008067288 A | 3/2008 |
| JP | 2008196228 A | 8/2008 |
| JP | 2008274560 A | 11/2008 |
| WO | 98/34818 A | 8/1998 |
| WO | 2006/035972 A | 4/2006 |
| WO | 2009/109578 A2 | 9/2009 |

OTHER PUBLICATIONS

Japanese Office Action, Application No. 2010-549128, 7 pages (German), Feb. 1, 2013.

* cited by examiner

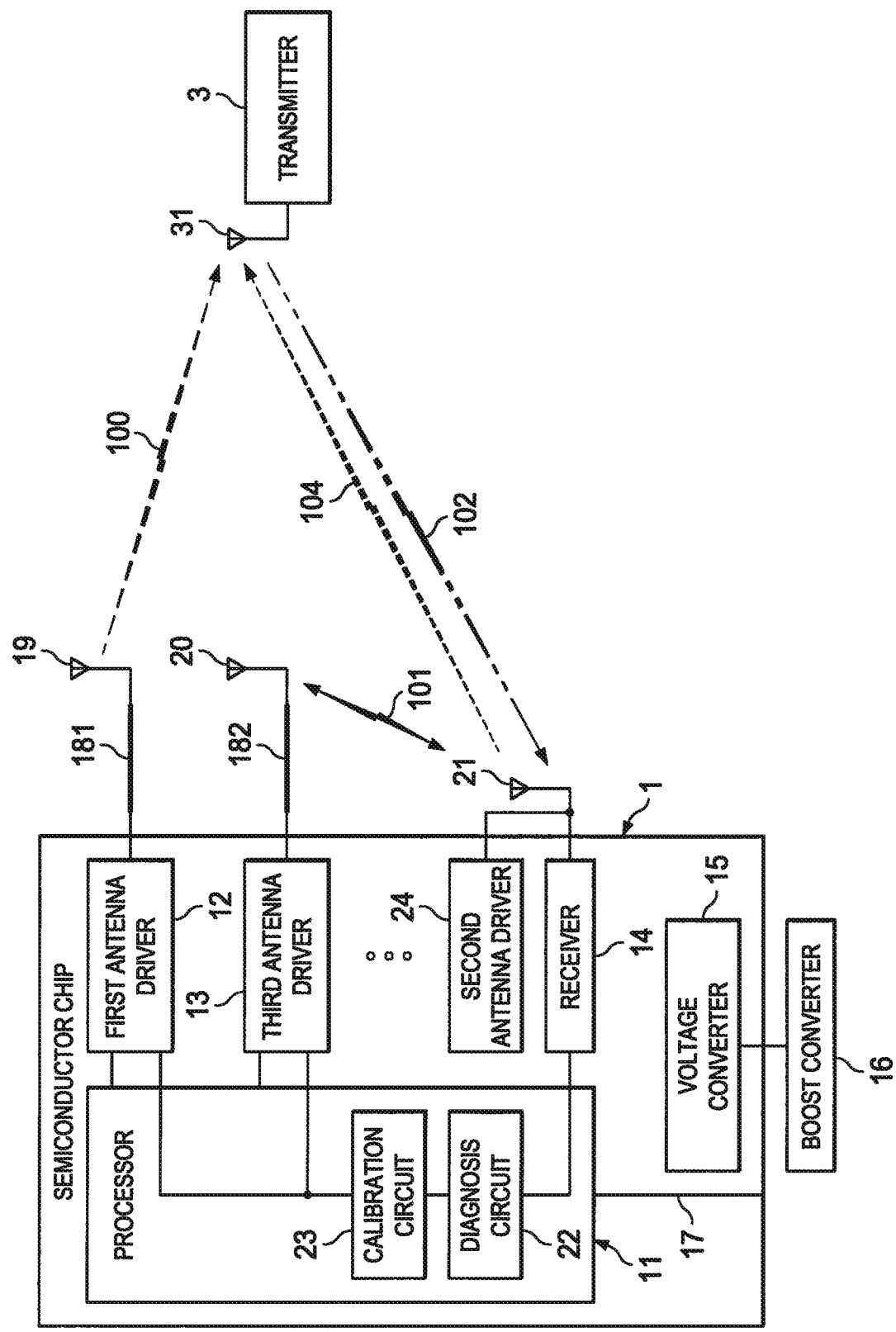

ELECTRIC CIRCUIT FOR AN ACCESS CONTROL AND FOR AN IMMOBILIZER OF A VEHICLE AND METHOD FOR CALIBRATING AN ANTENNA DRIVER

CROSS-REFERENCE TO RELATED APPLICATIONS

This application is a U.S. National Stage Application of International Application No. PCT/EP2009/052508 filed Mar. 3, 2009, which designates the United States of America, and claims priority to German Application No. 10 2008 012 882.1 filed Mar. 6, 2008, the contents of which are hereby incorporated by reference in their entirety.

TECHNICAL FIELD

The invention relates to an electric circuit for an access control and for an immobilizer of a vehicle and also to a method for calibrating an antenna driver.

BACKGROUND

Wireless access systems are use in automotive technology to unlock a motor vehicle or to make it possible to open a vehicle door. With passive wireless access systems a person carries an ID (identity) transmitter with them. This ID transmitter communicates with a base station located in the vehicle as soon as it comes closer than a specific distance to the vehicle or the base station. With passive systems the base station usually emits a signal in the long-wave range, which is also referred to as Low Frequency (LF). The transmit frequency is around 125 kHz or 135 kHz for example. The ID transmitter, also referred to as a transponder below, responds to the base station with a signal in the decimeter or Ultra High Frequency (UHF) wave range. In Europe this frequency is typically 432 MHz or 868 MHz. The transponder transmits at the high frequency since transmitting at a low frequency over the relatively long distance requires a lot of energy, which the battery of the ID transmitter cannot provide over the long term.

U.S. Pat. No. 7,317,376 B2 discloses a combined system of an access system and an immobilizer. An immobilizer ensures that the automobile can only be started when the driver is in the vehicle. With the immobilizer presented in U.S. Pat. No. 7,317,376 B2, the base station sends out a low-frequency signal to which the transponder likewise reacts with a low-frequency signal. For the short distances between transponder and base station the transmitter can also emit the low-frequency signal with little energy. In this device the low-frequency signals for the immobilizer and the access system are controlled with the same antenna, which is disadvantageous however since the requirements for the signal strength and the quality of the resonant circuit for the two systems differ and the transmit powers cannot be jointly well optimized. If different antennas are used for the two systems, the problem arises however that the outlay for the systems increases.

SUMMARY

According to various embodiments, an electric circuit for an access control and an immobilizer of a vehicle can be provided which can be better adjusted for the transmit powers of the antennas, with the outlay involved still to be kept low.

Furthermore, according to further embodiments, a method for calibrating an antenna circuit for such an electric circuit can be provided.

According to an embodiment, an electric circuit for an access control and for an immobilizer of a vehicle, may comprise a first antenna driver for driving a first antenna for sending a signal on identification of an ID transmitter for the access control of the vehicle, a second antenna driver for driving a second antenna for transmitting a signal on identification of an ID transmitter for the immobilizer of the vehicle, and a receiver device for receiving a signal received by an antenna for identifying an ID transmitter for the immobilizer, with the first antenna driver and the receiver device being integrated jointly in a semiconductor chip.

According to a further embodiment, there can also be a diagnosis circuit in the semiconductor chip for calibrating the signal sent by the first antenna, with at least one input of the diagnosis circuit being connected to an output of the receiver device. According to a further embodiment, a calibration circuit can be provided for calibrating the first antenna driver, with the calibration circuit having at least one input which is connected to an output of the diagnosis circuit. According to a further embodiment, a third antenna driver for driving a third antenna on identification of an ID transmitter for the access system of a vehicle can be provided, with the characteristics of the first antenna driver and of the third antenna driver being able to be set independently of one another during simultaneous operation. According to a further embodiment, a control circuit of a boost converter can also be also accommodated in the semiconductor chip. According to a further embodiment, the electric circuit may comprise the first antenna and the second antenna. According to a further embodiment, the second antenna driver can be integrated together with the first antenna driver and the receiver device. According to a further embodiment, the electric circuit may comprise a synchronization output for outputting a reference clock to synchronize with at least one further semiconductor chip. According to a further embodiment, the electric circuit may comprise a switchover device with which the connection between antenna drivers and antennas or between the receiver device and antennas can be switched over.

According to another embodiment, an electrical circuit as described above can be used in a vehicle.

According to yet another embodiment, a method for calibrating an antenna driver for an electric circuit as described above, may comprise the following steps: a) Operating the first antenna driver so that the first antenna transmits a low-frequency signal, b) Receiving the low-frequency signal by means of the second antenna and of the receiver device, c) Diagnosis of the received signal.

According to a further embodiment of the method, the method may further comprise d) Adjusting the first antenna driver in accordance with a setpoint value. According to a further embodiment of the method, in step c) the received signal can be diagnosed in relation to the frequency, the signal-to-noise ratio or the signal strength. According to a further embodiment of the method, in step d) the current output by the first antenna driver can be adjusted.

BRIEF DESCRIPTION OF THE DRAWINGS

The invention will be explained in an exemplary embodiment with reference to the FIGURE.

FIG. 1 shows an access system as well as an immobilizer of a motor vehicle.

DETAILED DESCRIPTION

An electric circuit is provided for an access control and for an immobilizer of vehicle. The access control controls the opening and locking of the vehicle while the immobilizer ensures that the vehicle cannot be started while the immobilizer is activated. The electric circuit contains a first antenna driver for driving a first antenna for sending a signal on identification of an ID transmitter for the access control of the vehicle.

A second antenna driver is provided for driving a second antenna for sending out a signal on identification of an ID transmitter for the immobilizer of the vehicle. The electric circuit also contains a receiver device for receiving a signal received by an antenna for identifying an ID transmitter for the immobilizer. The antenna can be purely a receive antenna, in an alternate form of embodiment it involves a second antenna.

The first antenna driver and the receiver device are integrated together in a semiconductor chip. The electric circuit has the advantage that the joint integration reduces costs, since fewer components are used and communication between the elements, for example between first antenna driver and the receiver device, is simplified.

This is especially the case when the receiver device, which is actually configured to receive the low-frequency signals for the immobilizer, is also used for diagnosis of the first antenna driver. In one form of embodiment a diagnosis circuit is therefore provided for measuring the signal emitted by the first antenna. This means for example that the operating frequency of the first driver circuit can be calibrated in order to detect whether this has become detuned because of environmental conditions. In particular components located outside the semiconductor chip, such as the antennas or capacitors, vary greatly with the temperature. This can cause the signal strength of the signal emitted to have changed, which is compensated for by adjusting the antenna driver.

Different vehicle bodies and antenna positions frequently detune the working frequency of the driver. This reduces the range of the magnetic field generated by the antenna and may possibly lead to a malfunction of the system. If additionally a calibration circuit is provided for adjusting the first antenna driver, the first antenna driver can be adjusted on the basis of the calibration in the diagnosis circuit, by its frequency or its output power being changed for example.

In a further form of embodiment a third antenna driver is provided for driving a third antenna on identification of an ID transmitter for the access system of a vehicle. For access systems it is advantageous to use a number of antennas simultaneously since a user can approach the vehicle from different directions. More than two antennas can also be used, in one exemplary embodiment the FIGURE is six antennas and six antenna drivers. The characteristics of the first antenna driver and the characteristics of the second antenna driver can be adjusted independently of one another during simultaneous operation, since their respective signal strengths or frequencies can be differently detuned.

In a form of embodiment a control circuit of a boost converter is also accommodated on the semiconductor chip. A boost converter is to be understood as a circuit which creates a high voltage from a low voltage. The converter is needed to generate a high voltage with which the output signal for the antennas is driven. It is recommended that this control circuit also be integrated in the semiconductor chip in order to reduce the costs of the system further and to reduce the communication between the antenna drivers, the receiver device and also the control circuit for the boost converter.

Preferably the second antenna driver is also integrated together with the first antenna driver and the receiver device in the semiconductor chip, in order to save additional costs.

In a form of embodiment a synchronization output is provided in the semiconductor chip which serves to output a reference clock for synchronizing the first antenna driver with at least one further semiconductor chip. The synchronization output makes it possible for antenna drivers of a number of chips to simultaneously drive a single antenna. This reduces the power consumption of each individual chip and thus increases its lifetime.

According to another embodiment the electric circuit can be used in a vehicle. By integrating the functions of the immobilizer and the access system while using different antenna drivers, the communication between the two systems is improved and the probability of them interfering with each other is reduced.

According to yet another embodiment, in a method for measuring an antenna driver of an electric circuit according to various embodiments, the first antenna driver is driven such that the first antenna emits a low-frequency signal. Subsequently the low-frequency signal is received by means of the second antenna and the receiver device and finally the received signal is diagnosed. In this case the receiver device is used as receiver device for a low-frequency signal in order to diagnose the first antenna driver. The signal sent out by the first antenna is received and evaluated during operation by the ID transmitter.

During diagnosis the frequency, the signal-to-noise ratio or the signal strength of the low-frequency signal are preferably calibrated. This enables a check to be made as to whether the low-frequency signal is transmitting so that it can be detected by the ID transmitter at the specified distance from the vehicle.

In an embodiment the diagnosis step follows a step for adjusting the first antenna driver in accordance with a setpoint value, so that in future the first antenna emits signals with the desired characteristics. The setpoint value can be stored in a lookup table on the semiconductor chip.

The device contains a semiconductor chip 1, an ID transmitter 3, external components of a boost converter 16, the external power supply lines 181 and 182, a first antenna 19, a second antenna 21 and a third antenna 20. Apart from the ID transmitter 3, all elements belong to the base station in the vehicle.

The semiconductor chip 1 contains a control device and data processing 11, a first antenna driver 12, a second antenna driver 24, a third antenna driver 13, a receiver device 14, a circuit part for a voltage converter 15 and also a synchronization output 17.

The first antenna driver 12 is connected to the antennas via the external power supply line 181, while the third antenna driver 13 is connected via the external power supply line 182 to the third antenna 20. The receiver device 14 is connected with one input to the second antenna 21.

The first antenna 19 is used as a transmit antenna for the access control of the vehicle. In the situation in which the vehicle is parked and locked, the first driver circuit 12 drives the first antenna 19 at regular intervals, which then emits a low-frequency signal with a frequency of 125 kHz. If the ID transmitter is located in the vicinity of the vehicle, it receives this low-frequency signal 100 by means of its antenna 31.

If the emitted signal was sent out by the vehicle with the correct code, the ID transmitter 3 sends a high-frequency signal back to the base station. The antenna on the ID transmitter 3 and the receive circuit in the base station for this high-frequency signal are not shown in FIG. 1. The associated receive antenna for this high-frequency signal is connected to a further semiconductor chip of the control device for the access control and the immobilizer. This further semiconductor chip processes the high-frequency signal. If this processing unit calculates that the received signal has been sent out by the correct ID transmitter 3, it unlocks the vehicle.

As soon as the vehicle is unlocked, it depends on the immobilizer whether the vehicle can be started. To unlock the immobilizer communication takes place between the semiconductor chip 1 via the antennas 21 and 31 with the ID transmitter 3. In an application example the second antenna 21 is in a recess of the center console of the vehicle. To enable the vehicle to be started, the driver must place the ID transmitter 3 in this recess. Because of the short distance between the second antenna 21 and the ID transmitter 3 only a little energy is required to exchange the low-frequency signals between the two components wirelessly. The small distance also helps to restrict possible disruptions to communication. The requirements regarding the functional capabilities of the immobilizer are very high and fault-free communication must be guaranteed if possible under all circumstances.

To interrogate whether the immobilizer is to be deactivated, the second antenna driver 24 drives the second antenna 21 so that it transmits a low-frequency signal 104 with a frequency typically in the range of 125 kHz. However frequencies of for example 20 kHz or 135 kHz can also be used. The transmitter 3 receives this signal 104 at its antenna 31, decodes it and for its part sends a low-frequency signal 102 back via the antenna 31. The low-frequency signal 102 is received with the second antenna 21 and is demodulated and decoded in the receiver device 14. If it is established that the signal meets the requirements, the immobilizer is deactivated and the driver can start the vehicle, by pressing a button for example.

The antennas are also diagnosed in the semiconductor chip 1. The first antenna driver 12 controls its output so that the first antenna 19 emits a signal 101 of specific field strengths. This signal is received by the receive antenna 21 and evaluated by the receiver device 14. The receiver device 14 is connected at at least one output to at least one input of the diagnosis circuit 22, which for its part has at least one output which is received by the calibration circuit 23.

If it is established in the diagnosis circuit 22 that the signal does not meet specific requirements, regarding frequency, signal strength or signal-to-noise ratio for example, a corresponding signal is output from the diagnosis circuit 22 to the calibration circuit 23 so that the first antenna driver 12 will be correctly calibrated. This can be undertaken for example by the output power or the frequency of the first antenna driver 12 being changed.

Because the first antenna driver 12 which is responsible for driving the antenna for the access control, is accommodated on the same semiconductor chip 1 as the receiver device 14 for the immobilizer, it is possible to use the receiver device 14 in order to calibrate the first antenna driver 12.

A loss of adjustment of the signal strength of the signal reduces the range of the magnetic field generated by the antenna and may possibly lead to a malfunction of the system. The detuning can be caused by changing environmental conditions such as for example temperature fluctuations. The auto calibration shown here enables the calibration of the output power of the first antenna driver 12 to even be undertaken after the semiconductor chip 1 is fitted into the vehicle. The fact that the first antenna driver 12 is integrated with the receiver device 14 in the semiconductor chip 1 enables calibration to be undertaken within the semiconductor chip 1 and expensive communication, for example over an external CAN bus, becomes unnecessary.

In addition the joint provision of the first antenna driver 12, the second antenna driver 13 and the receiver device 14 on a single semiconductor chip 1 leads to a smaller space requirement for the overall control device, whereby costs will also be reduced.

In the same way the third antenna driver 13 can be calibrated. It is now possible to calibrate the low-frequency signal very exactly, something which was previously not been possible or only possible with difficulty. This enables the power to be automatically calibrated and the power values are able to be safeguarded independently of the vehicle type and over the entire lifetime of the vehicle. It is possible to allow higher qualities than previously in order to obtain higher reader ranges with the same driver power.

The external components 16 contain items such as the power transistors of the boost converter. Such power transistors usually need specifically-adapted manufacturer technologies and are thus preferably provided externally.

The strength of the transmitted signal 100 depends on the operating conditions of the vehicle, on the temperature for example. For this reason it makes sense also to calibrate the first antenna drive 12 in the field during the operation of the vehicle. This can be done at specific time intervals which are programmed in. If the result of the diagnosis is that the first antenna circuit 12 can no longer be calibrated, the driver is given a warning indication so that he can have the vehicle repaired.

In an embodiment not shown in the FIGURE a switchover device is located between the antenna drivers 12, 13 and 24 and the corresponding antennas 19, 20, 21, with which the connections between the antenna drivers and the antennas can be exchanged. Thus the first antenna 19 can be connected to the third antenna driver 13 and the third antenna 22 the first antenna drive at 12 by means of the switchover device. In one form of the embodiment the switchover device connects the first antenna 19 with the receiver device 14 and the second antenna 21 with the first antenna driver 12.

The synchronization output 17 is needed for synchronization with antenna drivers of a further semiconductor chip or of a number of further semiconductor chips. The first antenna 19 is driven in one form of embodiment by a further antenna driver of another semiconductor chip, with the output of this further antenna driver being connected in parallel with the first antenna driver 12.

So that the first antenna driver 12 and this further antenna driver are switched at the same time, a synchronization is necessary, typically by means of a shared clock generator.

No further boost converter 15 needs to be provided in the further chip, since the increased voltage of up to 40 V provided by the circuits 15 and 16 can be used by both semiconductor chips. An oscillator for generating a reference frequency only needs to be provided in one of the semiconductor chips.

The signals for exchanging the information needed for the synchronization will be provided via the synchronization output 17. If the semiconductor chip 1 is realized as an ASIC (Application Specific Integrated Circuit) it is structured because of the synchronization output 17 as a cascadable ASIC. The drivers of a number of these ASICs are synchronized with each other via a reference clock, but the voltage booster (DC-DC converter) and the communication to a microcontroller can also be used jointly by a number of semiconductor chips.

LIST OF REFERENCE CHARACTERS

1 Semiconductor chip
3 ID transmitter
11 Control device and data processing

12 First antenna driver
13 Third antenna driver
14 Receiver device
15 Logic for voltage converter
16 External components for voltage converter
17 Synchronization output
19 First antenna
20 Third antenna
21 Second antenna
22 Diagnosis circuit
23 Calibration circuit
24 Second antenna driver
31 Antenna
100, 101, 102, 104 Low-frequency signals 181, 182 external power supply line

What is claimed is:

1. An electric circuit for an access control and for an immobilizer of a vehicle, comprising:
    a first antenna driver for driving a first antenna for sending a signal on identification of an ID transmitter for the access control of the vehicle,
    a second antenna driver for driving a second antenna for transmitting a signal on identification of an ID transmitter for the immobilizer of the vehicle,
    a receiver device for receiving a signal received by an antenna for identifying an ID transmitter for the immobilizer,
    a third antenna driver for driving a third antenna on identification of the ID transmitter for the access system of the vehicle,
    wherein the first antenna driver, the second antenna driver, the receiver device, and the third antenna driver are integrated onto a single semiconductor chip, and
    wherein characteristics of the first antenna driver and the third antenna driver are independently controllable during simultaneous operation of the first and third antenna drivers.

2. The electric circuit according to claim 1, further comprising a diagnosis circuit in the semiconductor chip for calibrating the signal sent by the first antenna, with at least one input of the diagnosis circuit being connected to an output of the receiver device.

3. The electric circuit according to claim 2, further comprising a calibration circuit for calibrating the first antenna driver, with the calibration circuit having at least one input which is connected to an output of the diagnosis circuit.

4. The electric circuit according to claim 1, wherein a control circuit of a boost converter is also accommodated in the semiconductor chip.

5. The electric circuit according to claim 1, comprising the first antenna and the second antenna.

6. The electric circuit according to claim 1, comprising a synchronization output for outputting a reference clock to synchronize with at least one further semiconductor chip.

7. The electric circuit according to claim 1, comprising a switchover device with which the connection between antenna drivers and antennas or between the receiver device and antennas can be switched over.

8. A method comprising:
    providing an electrical circuit comprising a first antenna driver for driving a first antenna for sending a signal on identification of an ID transmitter for an access control of a vehicle, a second antenna driver for driving a second antenna for transmitting a signal on identification of an ID transmitter for an immobilizer of the vehicle, a receiver device for receiving a signal received by an antenna for identifying an ID transmitter for the immobilizer, and a third antenna driver for driving a third antenna on identification of the ID transmitter for the access system of the vehicle, wherein the first antenna driver, the second antenna driver, the receiver device, and the third antenna driver are integrated onto a single semiconductor chip,
    using the electrical circuit in the vehicle, and
    independently controlling characteristics of the first antenna driver and the third antenna driver during simultaneous operation of the first and third antenna drivers.

9. A method for calibrating an antenna driver for an electric circuit comprising a first antenna driver for driving a first antenna for sending a signal on identification of an ID transmitter for an access control of a vehicle, a second antenna driver for driving a second antenna for transmitting a signal on identification of an ID transmitter for an immobilizer of the vehicle, a receiver device for receiving a signal received by an antenna for identifying an ID transmitter for the immobilizer, and a third antenna driver for driving a third antenna on identification of the ID transmitter for the access control of the vehicle, wherein the first antenna driver, the second antenna driver, the receiver device, and the third antenna driver are integrated onto a single semiconductor chip, the method comprising:
    a) operating the first antenna driver so that the first antenna transmits a low-frequency signal,
    b) receiving the low-frequency signal by means of the second antenna and of the receiver device,
    c) diagnosing the received signal.

10. The method according to claim 9, further comprising:
    d) Adjusting the first antenna driver in accordance with a setpoint value.

11. The method according to claim 9, wherein, in step c) the received signal is diagnosed in relation to a frequency, a signal-to-noise ratio or a signal strength.

12. The method according to claim 9, wherein, in step d) a current output by the first antenna driver is adjusted.

13. The method according to claim 9, wherein calibration is controlled by a diagnosis circuit in the semiconductor chip, with at least one input of the diagnosis circuit being connected to an output of the receiver device.

14. The method according to claim 13, wherein the electric circuit further comprises the third antenna driver for driving the third antenna on identification of the ID transmitter for the access system of the vehicle, and the method further comprises setting the characteristics of the first antenna driver and of the third antenna driver independently of one another during simultaneous operation.

15. The method according to claim 9, wherein a control circuit of a boost converter is also accommodated in the semiconductor chip.

16. The method according to claim 9, wherein the electrical circuit comprises the first antenna and the second antenna.

17. The method according to claim 9, comprising outputting a reference clock to synchronize with at least one further semiconductor chip.

* * * * *